June 19, 1962 P. L. GAGNON 3,039,161
CLAMP
Filed Aug. 29, 1960

INVENTOR.
Paul L. Gagnon
BY Adams, Forward and McLean
ATTORNEYS

United States Patent Office 3,039,161
Patented June 19, 1962

3,039,161
CLAMP
Paul L. Gagnon, 24 Harrington Terrace,
West Orange, N.J.
Filed Aug. 29, 1960, Ser. No. 52,512
3 Claims. (Cl. 24—263)

My invention relates to a clamping device. More particularly, my invention relates to a portable eye clamp for attachment to an angle iron, channel iron, and the like.

In the usual construction of merchant vessels the shell plates constituting the shell of the vessel are welded to a frame composed of angle iron or channel iron. These angle irons are vertically spaced about 30 inches apart thereby leaving an exposed framework of such angle irons in the interior of the vessel. Normally, pad-eyes are welded in a number of places to the angle iron frames and are employed to secure cargo with wire, turn-buckles and clips. Due to the variety of sizes and shapes of cargo carried in merchant vessels, the pad-eyes are not always positioned in the proper location for adequately securing the cargo. To weld pad-eyes in every possible position and location so as to make them available to secure properly the almost infinite variety of cargoes that might be carried would obviously be prohibitively expensive and impracticable.

It is an object of my invention to provide a portable eye-clamp which can be firmly clamped to any angle iron and which furnishes a conveniently located eye to which clips, hooks, etc., can be attached.

The eye-clamp of my invention is designed for attachment to an angle iron having a right-angle flange and web. The eye-clamp comprises a U-shaped frame composed of a first upper arm, a second lower arm and an interconnecting body portion, the frame being sized to receive the flange of said angle-iron between the first and second arms. The first upper arm has bearing surfaces for contact with the inner surfaces of the flange and web of the angle iron. A gripping member having an L-shaped cross-section is rotatably attached at one end to the second arm, extends beyond said first arm, and has bearing surfaces for contact with the outer surfaces of the flange and web of the angle iron. The gripping member is adjustable to permit entry of the flange of the angle-iron between the first and second arms and to receive the web of the angle iron. Movable means are associated with the second arm providing at one end advantageously an eye and at the other end a bearing surface contacting the gripping member for maintaining the gripping member in contact with the outer surfaces of the flange and web of the angle-iron and for maintaining the inner surfaces of the flange and web of said angle iron in contact with the first upper arm of the U-shaped frame. Means are also provided for holding the bearing surface of the movable means in contact with the gripping member while the gripping member is in contact with the angle iron.

Specific embodiments of the eye-clamp of my invention are shown in the accompanying drawings wherein.

Figure 1:
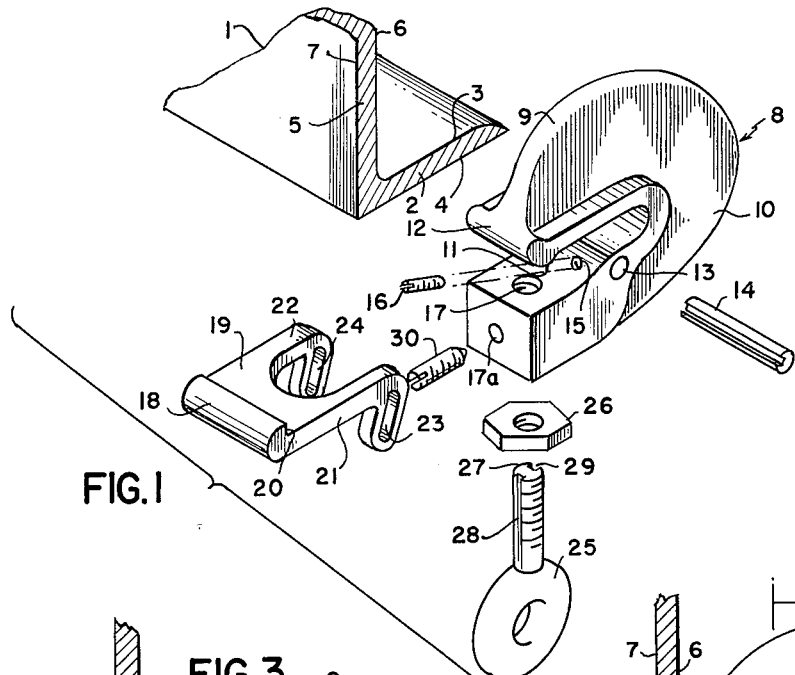
FIGURE 1 is an isometric view showing the component parts of the device of my invention together with a fragmentary portion of angle iron.
Figure 3:
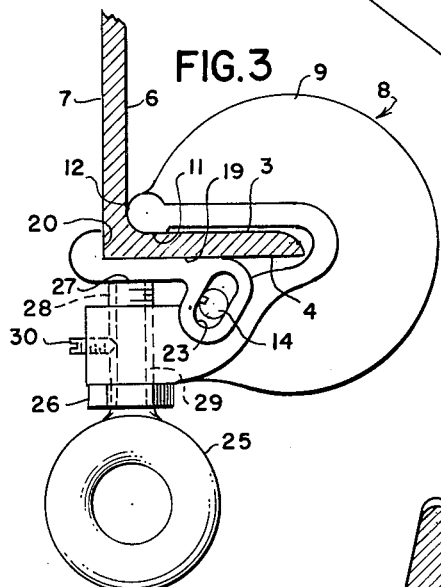
FIGURE 3 shows the device of my invention clamped to the angle iron.
Figure 2:
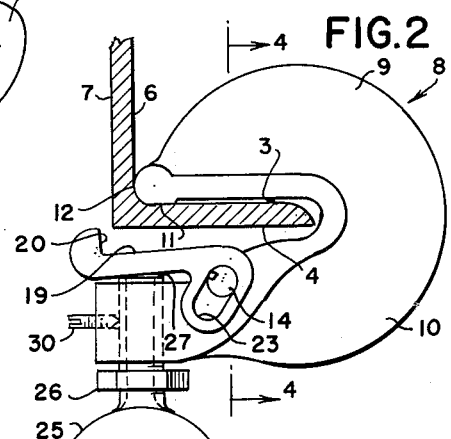
FIGURE 2 shows the device of my invention in the unclamped position with the angle iron in place.

In FIGURE 1, an angle iron 1 is shown having flange 2 with inner and outer surfaces 3 and 4 respectively and web 5 having inner and outer surfaces 6 and 7 respectively. Also shown in FIGURE 1 are U-shaped frame 8 having upper arm 9 and lower arm 10. Upper arm 9 has bearing surfaces 11 and 12 for contact with the inner surfaces 3 and 6 respectively of angle iron 1. Lower arm 10 has an opening 13 for insertion of pin 14 and tapped opening 15 for insertion of set-screw 16, which latter holds pin 14 in fixed position. Lower arm 10 also has tapped holes 17 and 17a. FIGURE 1 additionally shows gripping member 18 having bearing surfaces 19 and 20 for contact with the outer surfaces 4 and 7 respectively of angle iron 1. Gripping member 18 additionally has arms 21 and 22 containing slots 23 and 24 for insertion of pin 14. Slots 23 and 24 by movement with respect to pin 14 permit vertical movement of bearing surface 19 with respect to bearing surface 11 of upper arm 9 and permit lateral movement of bearing surface 20 with respect to bearing surface 12 of upper arm 9 thereby permitting adjustment of the assembled clamp to various sized angle irons. FIGURE 1 further shows eye-bolt 25 and lock-nut 26. Eye-bolt 25 additionally can have grooves 28 and 29 for receiving set-screw 30. Eye-bolt 25 has bearing surface 27 which, when eye-bolt 25 is screwed into tapped hole 17, contacts the under surface of gripping member 18 as is shown in FIGURES 2 and 3, forcing the bearing surfaces 19 and 20 of gripping member 18 against the outer surfaces 4 and 7 of angle iron 1 and in turn the inner surfaces 3 and 6 of angle iron 1 against bearing surfaces 11 and 12 of upper arm 9. Lock-nut 26 and/or set-screw 30 when in place hold bearing surface 27 of eye-bolt 25 firmly in contact with the under surface of gripping member 18.

Although the specific embodiment of my invention described in the FIGURES 1, 2, 3 and 4 of the drawings has been shown in association with an angle iron, it is obvious that it can be employed with a channel iron, an I beam, an H beam or the like. In the latter two instances, the bearing surface 20 of gripping member 18 would not bear against the web but would bear against the outer edge of the flange.

Figure 5:
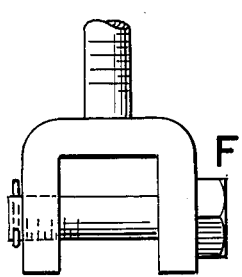
FIGURES 5 and 6 show alternate embodiments of specific components shown in FIGURE 1.

As shown in FIGURE 5, gripping member 18 can have instead of slots 23 and 24, generally inverted U shaped openings 31 and 32. The gripping member shown in FIGURES 1, 2 and 3 is particularly useful for providing attaching means to differing sizes of angle-irons and channel irons. The gripping member shown in FIGURE 5 is particularly useful for accommodating any two sizes of I beams and H beams, the arms 21 and 22 being of various lengths to accommodate a pair of beam sizes.

Figure 6:
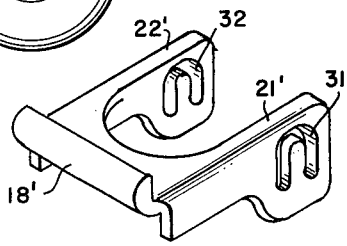
Figure 4:
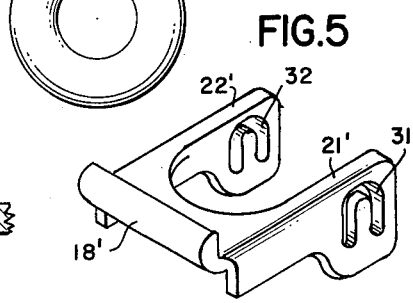
FIGURE 4 is a sectional view of the device of my invention taken along the line 4—4 of FIGURE 2.

Also although the specific embodiment of my invention described in FIGURES 1–3 of the drawings shows eye-bolt 25, it is obvious that other attaching means other than the eye can be provided at the end of the bolt. For example, FIGURE 6 shows a jaw and bolt arrangement for receiving an eye or ring attached to, for example, a double eye turn-buckle or a hook and eye.

Although not shown in the drawings, it is obvious that U shaped frame 8 can be sized so that bearing surfaces 11 and 12 provide a broad area of contact with the angle-iron. Such broad area of contact would decrease the possibility of bending the flange of the angle iron.

I claim:

1. A clamp for providing attaching means to a length of angle-iron having a right-angle flange and web which comprises a U-shaped frame composed of a first upper arm, a second lower arm and an interconnecting body portion, said frame being sized to receive the entire flange of said angle-iron between said first and second arms, said first upper arm having bearing surfaces for contact with the inner surfaces of the flange and web of said angle-iron, a gripping member having an L-shaped cross-section pivotably attached at one end to said second arm, extending beyond said first arm, and having bearing surfaces for contact with the outer surfaces of the flange and web of said angle-iron, said gripping member being adjustable to permit entry of the flange of said angle-iron between said first and second arms and to receive the web of said angle-iron, movable means associated with said second arm providing at one end attaching means and at the other end a bearing surface contacting said gripping member for maintaining said gripping member in contact with the outer surfaces of the flange and web of said angle-iron and for maintaining the inner surfaces of the flange and web of said angle-iron in contact with said first upper arm of said U-shaped frame, and means for holding the bearing surface of said movable means in contact with said gripping member while the gripping member is in contact with said angle-iron, said movable means being so situated that in fixed position its bearing surface contacts the gripping member at a surface including a point substantially in alignment with the inner surface of the web of the angle-iron.

2. A clamp for attachment to a length of angle-iron having a right-angle flange and web which comprises a U-shaped frame composed of a first upper arm, a second lower arm and an interconnecting body portion, said frame being sized to receive the entire flange of said angle-iron between said first and second arms, said first upper arm having bearing surfaces for contact with the inner surfaces of the flange and web of said angle iron, a gripping member having an L-shaped cross-section pivotably attached at one end to said second arm, extending beyond said first arm, and having bearing surfaces for contact with the outer surfaces of the flange and web of said angle-iron, said gripping member being adjustable to permit entry of the flange of said angle-iron between said first and second arms and to receive the web of said angle iron, movable means associated with said second arm providing at one end a bearing surface contacting said gripping member for maintaining said gripping member in contact with the outer surfaces of the flange and web of said angle-iron and for maintaining the inner surfaces of the flange and web of said angle-iron in contact with said first upper arm of said U-shaped frame, and means for holding the bearing surface of said movable means in contact with said gripping member while the gripping member is in contact with said angle-iron, said movable means being so situated that in fixed position its bearing surface contacts the gripping member at a surface including a point substantially in alignment with the inner surface of the web of the angle-iron.

3. A clamp for providing attaching means to a length of angle-iron having a right-angle flange and web which comprises a U-shaped frame composed of a first upper arm, a second lower arm and an interconnecting body portion, said frame being sized to receive the entire flange of said angle-iron between said first and second arms, said first upper arm having bearing surfaces for contact with the inner surfaces of the flange and web of said angle-iron, a gripping member having an L-shaped cross-section pivotably attached at one end to said second arm, extending beyond said first arm, and having bearing surfaces for contact with the outer surfaces of the flange and web of said angle-iron, said gripping member being adjustable outwardly from each of said first upper arm and said interconnecting body portion of said U-shaped frame about said pivotal attachment to permit entry of the flange of said angle-iron between said first and second arms and to receive the web of said angle-iron, movable means associated with said second arm providing at one end attaching means and at the other end a bearing surface contacting said gripping member for moving said gripping member inwardly toward each of said first upper arm and said interconnecting body portion of said U-shaped frame about said pivotal attachment and for maintaining said gripping member in contact with the outer surfaces of the flange and web of said angle-iron and for maintaining the inner surfaces of the flange and web of said angle-iron in contact with said first upper arm of said U-shaped frame, and means for holding the bearing surface of said movable means in contact with said gripping member while the gripping member is in contact with said angle-iron.

References Cited in the file of this patent
UNITED STATES PATENTS

| | | |
|---|---|---|
| 2,422,865 | Tucker | June 24, 1947 |
| 2,678,786 | Kindorf | May 18, 1954 |